United States Patent
Higuchi et al.

(10) Patent No.: US 11,146,766 B2
(45) Date of Patent: Oct. 12, 2021

(54) PROJECTION-TYPE VIDEO DISPLAY DEVICE

(71) Applicant: Maxell, Ltd., Kyoto (JP)

(72) Inventors: Haruhiko Higuchi, Tokyo (JP); Kazuhiko Tanaka, Tokyo (JP); Mitsuo Nakajima, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/481,901

(22) PCT Filed: Feb. 3, 2017

(86) PCT No.: PCT/JP2017/004033
§ 371 (c)(1),
(2) Date: Jul. 30, 2019

(87) PCT Pub. No.: WO2018/142586
PCT Pub. Date: Aug. 9, 2018

(65) Prior Publication Data
US 2019/0394434 A1    Dec. 26, 2019

(51) Int. Cl.
*H04N 9/31*    (2006.01)

(52) U.S. Cl.
CPC ......... *H04N 9/3182* (2013.01); *H04N 9/3114* (2013.01); *H04N 9/3194* (2013.01)

(58) Field of Classification Search
CPC ... H04N 9/3182; H04N 9/3114; H04N 9/3194
USPC .......................... 348/743, 744, 907, 808, 612
See application file for complete search history.

(56) References Cited

U.S. PATENT DOCUMENTS

| 9,470,966 B2* | 10/2016 | Sumiyoshi ............. G03B 21/26 |
| 2005/0073845 A1 | 4/2005 | Matsui |
| 2006/0067673 A1 | 3/2006 | Tanaka |
| 2007/0110304 A1 | 5/2007 | Tsukada |

(Continued)

FOREIGN PATENT DOCUMENTS

| JP | 2004-109246 A | 4/2004 |
| JP | 2007-060272 A | 3/2007 |

(Continued)

OTHER PUBLICATIONS

International Search Report of PCT/JP2017/004033 dated Apr. 25, 2017.

*Primary Examiner* — Samira Monshi
(74) *Attorney, Agent, or Firm* — Mattingly & Malur, PC (57) ABSTRACT

An object is to provide a technology for correcting color of a projected video more suitably. In order to solve the above-described object, a configuration includes a video projector configured to display a plurality of colors in time division and project a video to be displayed, and a color corrector configured to perform color correction on a projected video from the video projector. In the configuration, the projected video projected by the video projector is imaged by an internal imaging apparatus or an external imaging apparatus connected by wire or wireless connection, and the color corrector performs the color correction on the basis of a video corresponding to time division one period of the projected video detected from the imaged image or color information of the video corresponding to N times period of time division one period.

12 Claims, 8 Drawing Sheets

(56) References Cited

U.S. PATENT DOCUMENTS

2015/0049309 A1* 2/2015 Sumiyoshi ............ G06F 3/0304
　　　　　　　　　　　　　　　　　　　　353/31
2015/0208052 A1　 7/2015 Kobiki et al.

FOREIGN PATENT DOCUMENTS

| JP | 4120841 B2 | 7/2008 |
| JP | 2016-220080 A | 12/2016 |

* cited by examiner

PROJECTION-TYPE VIDEO DISPLAY DEVICE

TECHNICAL FIELD

The present invention relates to a video projection apparatus by a projector.

BACKGROUND ART

There is JP 4120841 B2 (Patent Document 1) as a technology for correcting color of a video so that a user is able to perceive the color more accurately without being influenced by a viewing environment at the time when the user views a projected video when the video is projected from a projector on a projection plane. In Patent Document 1, "a method of correcting color of a projector, including a color conversion generation step of generating color conversion causing a color appearance to be matched for each pixel or block of an image projected on a projection plane on the basis of first color information set in advance and second color information of the image projected on the projection plane, and a color correction step of performing color correction using the color conversion for each pixel or block of an input image, wherein the color conversion is a color conversion that maintains the color appearance of the color of the image projected on the projection plane in color information assumed for the image, by using a color adaptation model or a color appearance model and is able to be set for each pixel or block." is disclosed.

CITATION LIST

Patent Document

Patent Document 1: JP 4120841 B2

SUMMARY OF THE INVENTION

Problems to be Solved by the Invention

Color of a projected video projected from a projector is changed due to color of a projection plane, color of an ambient illumination of a projection environment, aging of a light source in the projector, and the like. On the other hand, in the method according to Patent Document 1, a technology for acquiring color information by imaging a video projected on a projection plane with a camera and correcting color of the projected video so that an influence of color and pattern of the projection plane and ambient light is reduced is disclosed. However, in a case in which a projector is a method that projects plurality of primary colors in a time division manner (hereinafter referred to as a color time division projector), such as digital light processing (DLP, registered trademark of U.S.A. TI Corporation) or an LED light source, if a time division period of the projected video and an exposure time of the camera for imaging the projected video are not synchronized, excess or deficiency of the exposure time occurs in each primary color, and color of the projected video is not able to be acquired accurately. On the other hand, in a case in which the camera is a rolling shutter method (hereinafter referred to as a rolling shutter camera), a time difference occurs in a start of exposure between an upper portion and a lower portions of an imaging sensor. Therefore, in a case in which the projected video of a color time division projector is imaged by the rolling shutter camera, the colors in the upper portion and the lower portion are different in the imaged image. Patent Document 1 does not disclose a method of acquiring color information when using a color time division projector or when using the color time division projector and a rolling shutter camera.

The present invention has been made in view of the above-described circumstances, and an object of the present invention is to provide a technique for correcting color of a projected video more suitably.

Solutions to Problems

In order to solve the problems described above, the present invention, for example, provides a configuration including a video projector configured to display a plurality of colors in time division and project a video to be displayed, and a color corrector configured to perform color correction on a projected video from the video projector. In the configuration, the projected video projected by the video projector is imaged by an internal imaging apparatus or an external imaging apparatus connected by wire or wireless connection, and the color corrector performs the color correction on the basis of a video corresponding to time division one period of the projected video detected from the imaged image or color information of the video corresponding to N times period of time division one period.

Effects of the Invention

According to the present invention, it is possible to provide a technique for correcting color of a projected video more suitably.

MODE FOR CARRYING OUT THE INVENTION

Hereinafter, an embodiment according to the present invention will be described with reference to the drawings.

Embodiment 1

Figure 1:
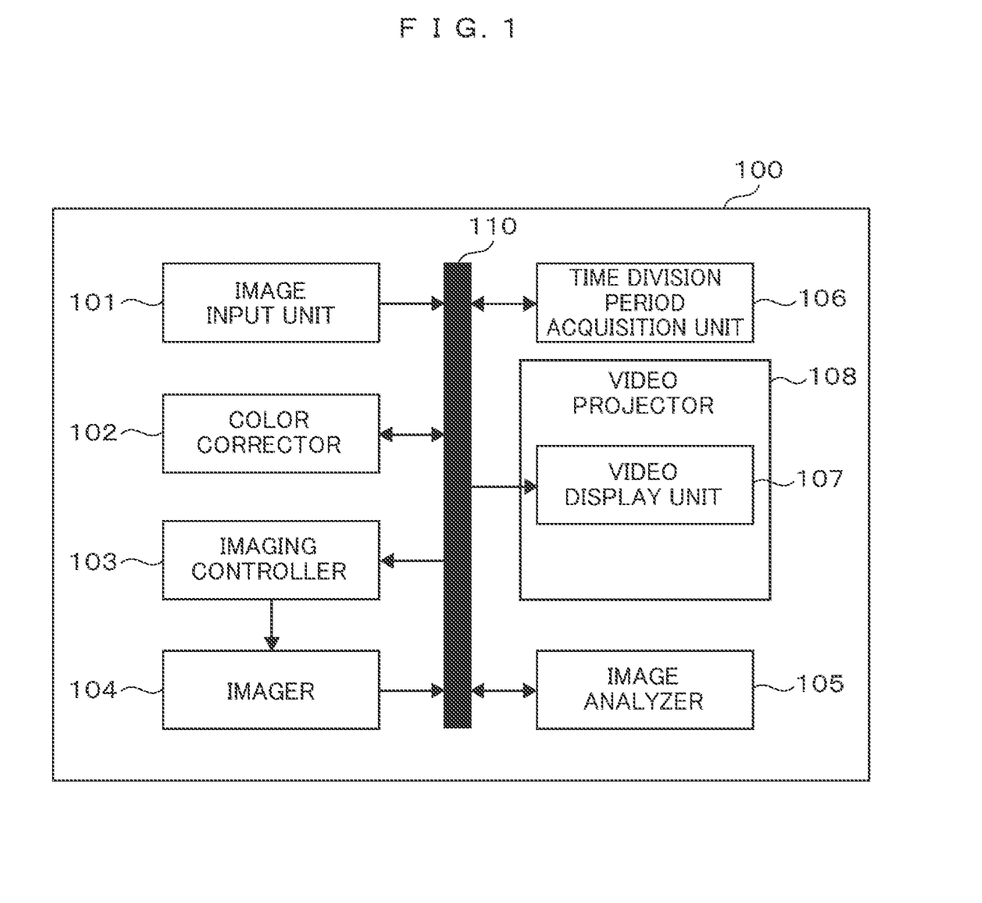
FIG. 1 is a configuration block diagram of a projection-type video display apparatus in Embodiment 1.

FIG. 1 is a configuration block diagram of a projection-type video display apparatus in the present embodiment. As shown in FIG. 1, a projection-type video display apparatus 100 includes an image input unit 101, a color corrector 102, an imaging controller 103, an imager 104, an image analyzer 105, a time division period acquisition unit 106, and a video display unit 107, a video projector 108, and a bus 110.

The image input unit 101 processes an image input from an externally connected apparatus such as a video player or a personal computer (PC). For example, in a case in which the input image is an analog image, the image is quantized by a decoding process and is converted into a digital image to be handled in the following process.

The color corrector 102 corrects color of the image input from the image input unit 101 based on color information analyzed by the image analyzer 105. As an example of a correction method, RGB, YCbCr, or HSV (hue, saturation, lightness) of each pixel in the image are adjusted so that an influence of color of a screen of a projection destination or color of ambient light is reduced, for color of a video (hereinafter referred to as a projected video) projected from the video projector 108.

The imaging controller 103 sets an exposure condition and a white balance so that exposure and the white balance of the imager 104 are not influenced by the screen of the projection destination and the color of the ambient light. In addition, imaging of a still image or a moving image is controlled so that color projected in time division of the image imaged by the imager 104 is able to be acquired for one or more cycles for the video projected from the video projector 108. As an example of the control method, the imager 104 is controlled to image a moving image for a time corresponding to one period or N times period of time division display acquired by the time division period acquisition unit 106.

The imager 104 images the video projected from the video projector 108 based on control information of the imaging controller 103. The imager 104 is installed to image the video projected from the video projector 108, or an imaging range is set. Although the imager 104 is shown in FIG. 1 as being built in the projection-type video display apparatus 100, the imager 104 may be a configuration independent of the projection-type video display apparatus 100. In this case, the imager 104, and imaging controller 103 and the image analyzer 105 are connected by wire or wirelessly. Note that, in the present embodiment, it is assumed that the imager 104 is a rolling shutter type camera in which there is a time difference between an exposure start in an upper portion and a lower portion of the imaged video.

The image analyzer 105 analyzes the image imaged by the imager 104, and acquires the color information of the video projected from the video projector 108. In a case in which the image imaged by the imager 104 has a configuration in which the projected video is included in a part of the image, a range of the projected video is estimated from the imaged image, and the color information is acquired within the range of the projected video. That is, by detecting the distribution of the color information in a plane of the imaged video by image recognition, the range of time division one period or N times period of the projected video is estimated. Specifically, as a method of estimating the range of the projected video, a pattern having a known shape or pattern may be given to the video projected from the video projector 108, and the video may be imaged and detected by the imager 104. Images may be imaged by the imager each of at the time when an appropriate image is projected from the video projector 108 and the time when the appropriate image is not projected, and the range of the projected video may be obtained from a difference thereof. Furthermore, the image analyzer 105 integrates the color information of a plurality of pixels on the basis of period information of the time division display acquired by the time division period acquisition unit 106, and obtains the color information corresponding to one period of the time division period. Specifically, for one sheet of still image, there is an in-plane integration mode in which pixel values within an appropriate range in the image plane are integrated, or a time integration mode in which the pixel values are integrated within an appropriate frame range for a specific pixel position among a plurality of imaged moving images.

The time division period acquisition unit 106 detects the time division period of the video projected from the video display unit 107 and the video projector 108. The video projector 108 includes, for example, a color wheel that rotates at high speed, and has a display method in which a human eye views a mixed color by separating and projecting different colors in a time direction by using the color wheel. The video display unit 107 displays an image corresponding to each color in synchronization with motor control information of the color wheel. The time division period acquisition unit 106 may use the motor control information of the color wheel similarly to the video display unit 107, and may detect the period of the color information separated from the projected video imaged by the imager 104 as will be described later. In addition, the time division period acquisition unit 106 may detect the time division period by analyzing the image by the image analyzer 105 and acquire the value thereof, and in a case in which the time division period is known, the time division period may be read from a memory that stores the time division period.

The video display unit 107 is disposed on an optical system optical path in the video projector 108, and displays an image of a display image input by the image input unit 101 in synchronized with a period and a timing of color time division display of the video projector 108. The video projector 108 transmits only a part of all the colors using, for example, each segment included in the color wheel, and in a case in which the time division method is, for example, red, green, and blue, the video display unit 107 separates the image input from the image input unit 101 into red, green, and blue. In addition, for example, even in a case in which a light source of the video projector 108 is an LED light source and, for example, lighting of red, green, and blue is switched at high speed, the video display unit 107 separates the image into red, green, and blue and displays the image in synchronization with the period and the timing of the color time division display of the video projector 108, as described above.

Figure 3:
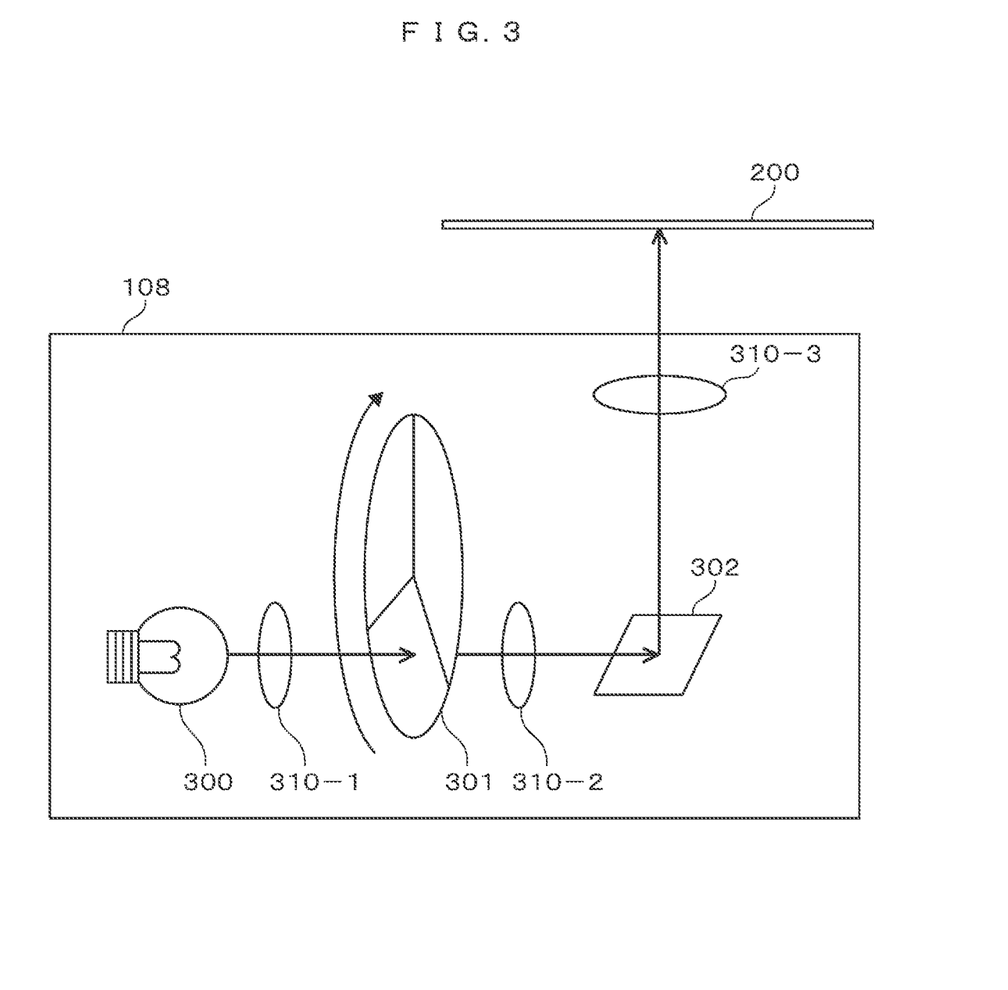
FIG. 3 is a diagram showing an operation principle of a DLP method of a video projector in Embodiment 1.

The video projector 108 displays the time division video created by the video display unit 107, and projects the video so that the human eye views the mixed colors. For example, FIG. 3 shows a configuration example of a DLP projector including the color wheel. However, as a method of switching each color in time division, for example, the light source of the video projector 108 may be a light source in which each color of a plurality of colors is independent, and lighting of the independent light sources of the plurality of colors may be switched at high speed, without using the color wheel. This is able to be realized by using an LED light source or a laser light source.

The bus 110 mediates image data, control information, and analysis information handled by each connected processor.

Figure 2:
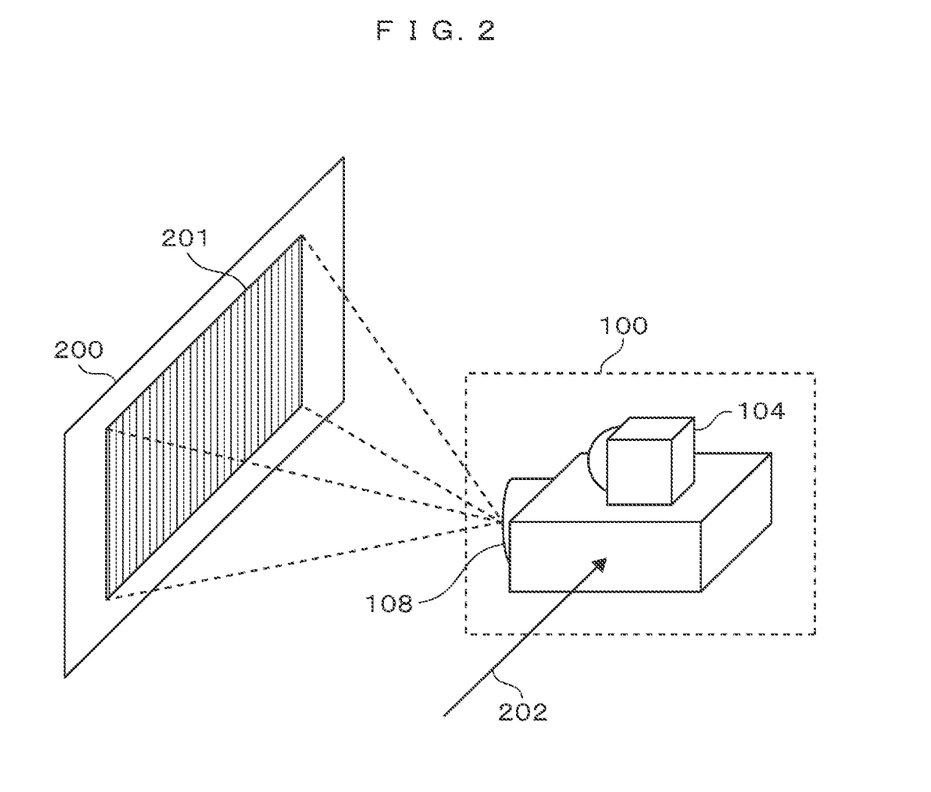
FIG. 2 is a diagram showing a use situation of the projection-type video display apparatus in Embodiment 1.

FIG. 2 is a diagram showing a use situation of the projection-type video display apparatus in the present embodiment. FIG. 2 shows a situation in which the image is projected on a screen 200 from the projection-type video display apparatus 100 in FIG. 1. In FIG. 2, it is assumed that the screen 200 has low or high color sense in a part of visible light wavelength rather than white. In addition, the imager 104 is installed under a condition in which it is possible to image a projected video 201 projected from the video projector 108 on the screen 200. A transmission line 202 is a data line for inputting the image to the projection-type video display apparatus 100, and an image output from a Blu-ray disc (BD) player or a PC is transmitted. The transmission line 202 may be wired or wireless.

In the configuration as shown in FIG. 2, the projection-type video display apparatus 100 projects the image suitable for acquiring the color information described later from the video projector 108, and images the projected video 201 projected on the screen 200 by the imager 104, and analyzes the color information by the image analyzer 105. Thereafter, the color corrector 102 corrects the color information with respect to the image input from the transmission line 202, thereby reducing the influence of the color sense of the screen 200 and correcting the image so that the user views a natural color.

FIG. 3 is a diagram showing an operation principle of a DLP projector using the color wheel and a digital mirror device (DMD) as an example of the video projector 108 for displaying a plurality of primary colors in time division. First, a light source 300 of white emits white light. The emitted white light is irradiated to a color wheel 301 by an illumination optical system 310-1. The color wheel 301 is a disk-shaped color filter that rotates at high speed, and has a characteristic of transmitting only beam of a specific wavelength. In FIG. 3, it is shown as being separated into three primary colors of red, green, and blue, and only one of the red, green, and blue is transmitted of the white light passing through the illumination optical system 310-1 by the timing of rotation of the color wheel 301. A rotation speed of the color wheel 301 is determined according to a frame rate of the display video of the projection-type video display apparatus. For example, in a case in which the video is displayed at 60 frames/second, the color wheel is required to rotate at least 60 rotations/second. The light transmitted through the color wheel 301 is irradiated to the DMD 302 by an illumination optical system 310-2. The DMD 302 is a micro mirror capable of variably controlling an inclination angle at high speed, and corresponds to one pixel of a display element. That is, the micro mirrors are disposed by the number of display pixels, and the inclination angles are individually controlled. Specifically, the inclination angle is variably controlled so as to be switched between an angle at which reflected light of the micro mirror reaches the screen 200 through a projection optical system 310-3 (an angle at which a light emission of the pixel corresponding to the micro mirror is turned on the screen) and an angle at which the reflected light of the micro mirror does not reach the screen 200 (an angle at which the light emission of the pixel corresponding to the micro mirror is turned off on the screen). Therefore, it is possible to control a time ratio of projection on the screen 200 with a time ratio of the pixel light emission turning on or off by angle inclination control, and to change a density of the display video. For example, in a case in which it is assumed that the color wheel 301 rotates at 60 rotations/second, and one primary color occupies ⅓ of a rotation angle, a time during which light of one primary color is irradiated to the DMD 302 is $1/180$ seconds. In a case in which it is assumed that the DMD 302 controls a grayscale of any of red, green, and blue every $1/180$ seconds and the grayscale of the display video is 8 bits for each primary color, the DMD 302 is required to control the angle inclination by a time resolution of $(1/180) \div 256$ seconds. In the light projected on the screen 200, flickering of any of red, green, and blue occurs in a sufficiently minute time, and the color can be perceived by the human eye by being mixed with time change.

Note that specific configurations of the illumination optical system 310-1, the illumination optical system 310-2, and the projection optical system 310-3 may adopt the optical system technology of the related art, and are not limited to a specific optical system. In FIG. 3, in order to simplify the description, a convex lens is simply described as a symbol indicating these optical systems; however, specifically, an optical system in which various optical elements are combined may be adopted. In addition, the color wheel 301 may have a white segment in addition to the three primary colors of the red, green, and blue.

Figure 4:
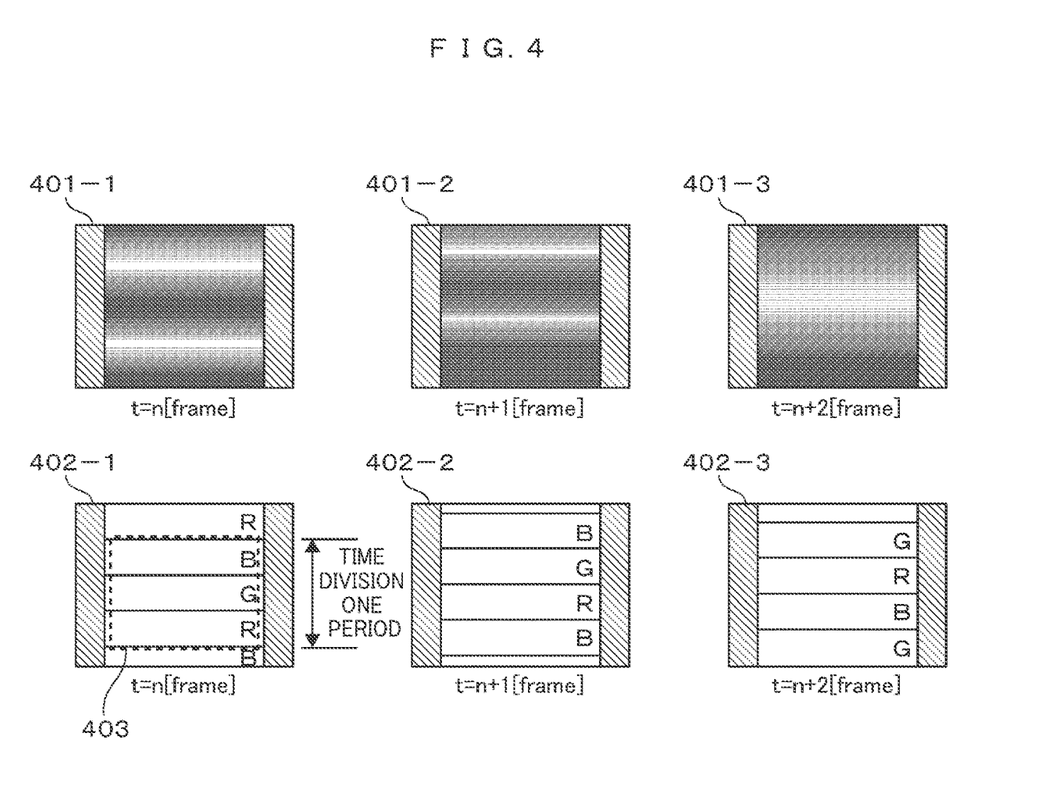
FIG. 4 is a diagram showing an example of an image obtained by imaging a projected video projected from the projection-type video display apparatus that displays a plurality of primary colors in time division by an imager that is a rolling shutter method in Embodiment 1.

FIG. 4 is a diagram showing an example of the image obtained by imaging the projected video 201 projected from the video projector 108 that displays a plurality of primary colors in time division by the imager 104 that is a rolling shutter method. In FIG. 4, imaged images 401-1 to 401-3 project a full screen white from the video projector 108 and show an example of an image obtained by projecting an actual projected video, and are obtained by imaging t=n, n+1, and n+2 frames as images obtained by successively imaging a plurality of frames by the imager 104. Note that a known halftone color rather than the full screen white color may be used. In addition, description drawings 402-1 to 402-3 schematically show band-shaped images appearing in the imaged images 401-1 to 401-3, and R, G, and B in the drawings denote a band of red, a band of green, and a band of blue, respectively. As described above, in the rolling shutter method camera, a deviation occurs in an exposure time in a vertical direction (a vertical direction in the imaged images 401-1 to 401-3) of an imaging element. On the other hand, as already described in FIG. 3, the projected video 201 by the color time division projector expresses the color by rotating the color wheel at high speed and switching the color of the video projected on the screen 200 at high speed. Therefore, due to the deviation of the in-plane exposure time in the imager 104 and the time division period displayed by the video projector 108, the imaged image is imaged in a state in which the colors are separated. In FIG. 4, the red, green, and blue are relatively clearly separated; however, an appearance of the color is different depending on a specification of the color wheel 301. In addition, in FIG. 4, the band-shaped color is moved in the vertical direction by t=n, n+1, and n+2, and the imaging frames. However, a change amount between the frames is different depending on the color wheel rotation speed in the video projector 108 and the deviation of the exposure time in the plane of the imager 104. Reference numeral 403 denotes an area of one period of time division of the color separated and imaged in the imaged image, and by integrating the color information in this area (in-plane integration), it is possible to acquire the color of the screen 200 to be imaged without receiving an influence of the deviation of the color caused by the display period of the color time division projector and the exposure time of the imager 104.

Figure 5:
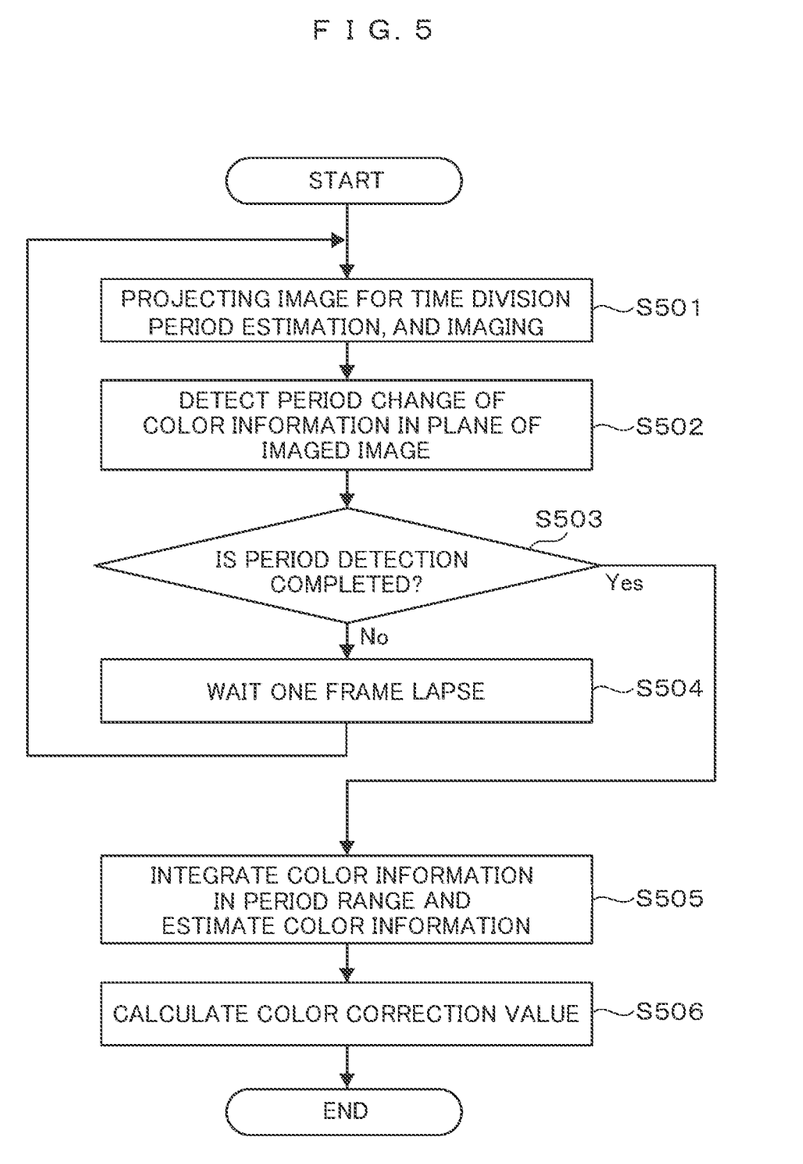
FIG. 5 is a flowchart in which color correction of the projected video is performed in Embodiment 1.

FIG. 5 shows a flowchart in which the color of the projected video is corrected by extracting the color information with high accuracy from the projected video imaged in the projector that displays the color in the time division in the present embodiment. The present embodiment is an example of color information detection by the in-plane integration in which the color information is integrated in a range of time division one period (or N times thereof).

In FIG. 5, first, in S501, the image for acquiring and estimating the color information is projected from the video projector 108, and the imager 104 images it. When viewing the video projected on the screen 200, in a case in which it is assumed that a surface reflectance of the screen 200 is Rref, a spectral characteristic of the video projected from the video projector 108 is Eprj, and a spectral characteristic of ambient light such as illumination is Eenv, a spectral characteristic Cref of light reflected from the screen 200 is able to be expressed as Formula 1. However, in Formula 1, λ represents a wavelength of the light.

[Formula 1]

$$C_{ref}(\lambda)=(E_{env}(\lambda)+E_{prj}(\lambda))R_{ref}(\lambda) \quad (1)$$

In order to correct the color of Eprj so that the color Cref perceived by the user is not influenced by the illumination light and the color of the screen 200, it is necessary to estimate the illumination light Eenv and the surface reflectance Rref of the screen 200. As an example of the video projected from the video projector 108, each of black, red, green, blue, red+green, green+blue, blue+red, white is projected and imaged, as a combination of the three primary colors of the red, the green, and the blue. In the image imaged by the imager 104, a band-shaped color is viewed in the plane as shown in FIG. 4.

In S502, for the image imaged in S501, the time division period in the plane of the single frame image is detected by the image analyzer 105. As shown in FIG. 4, in the imaged image, the band-shaped color is periodically and repeatedly viewed in the plane, and a period in which the color information in the vertical direction is changed is detected. In the imaged images 401-1 and the description drawing 402-1, it is possible to determine that R and B are periodically imaged in the plane of the imaged image, and at this time, in order to detect the period with high accuracy, for example, the imaged image may be HSV-converted and analyzed for a change in an H component. In addition, the time division period may be set by initial setting.

In S503, it is determined whether the detection of the time division period in S502 is normally completed, and in a case in which the detection of the time division period in S502 is not normally completed, one frame is waited in S504 and the process is repeated from S501. For example, in the imaged image 401-3 and the imaged image shown the explanatory diagram 402-3, a repetition of the R and the B is not able to be determined, and the period is not able to be detected. In this case, the imaging frame is changed and the determination process is repeated again.

In S505, the surface reflectance Rref of the screen 200 and the illumination light Eenv are estimated by integrating the color information of one period of the time division, by using the imaged image acquired in S501 to S504 and the detected time division period.

In S506, a color correction amount by the color corrector 102 is calculated on the basis of the surface reflectance Rref of the screen 200 and the illumination light Eenv estimated in S505.

As described above, when carrying out the color correction according to the projection condition in the color time division projector, even in a case in which the color separation is viewed when the projected video is imaged, it is possible to reduce the change of the appearance of the projected video due to the color of the projection plane on which the image is projected, the color of the ambient light, deterioration of the projector light source, and the like, and it is possible to detect and correct the color information with high accuracy.

Embodiment 2

In the present embodiment, an example of color information detection by a time integration method in which a small area at the same coordinates in the imaged image is integrated for a plurality of frames will be described.

Figure 6:
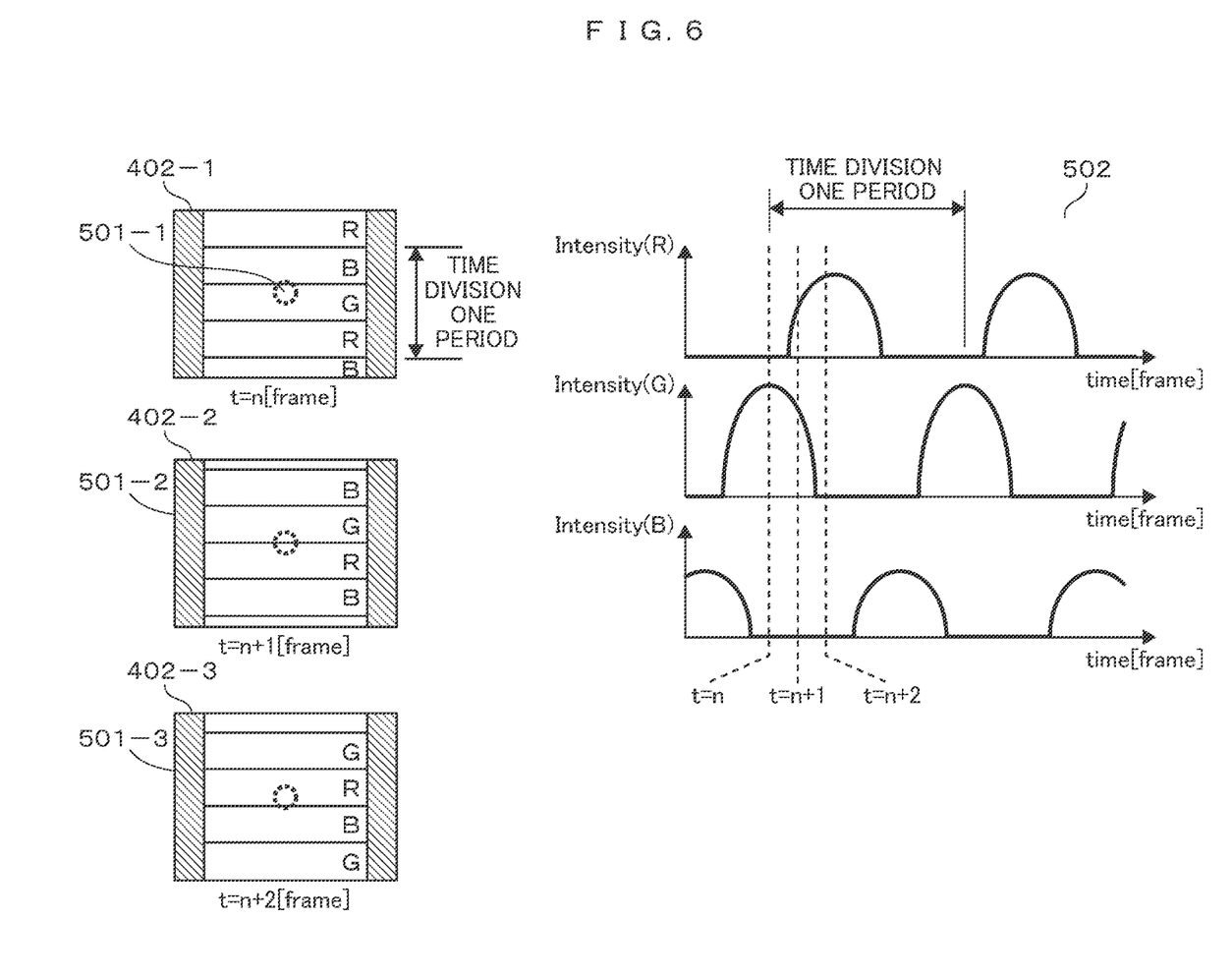
FIG. 6 is an explanatory diagram of color information detection by a time integration method in which a small area at the same coordinates in an imaged image is integrated for a plurality of frames in Embodiment 2.

FIG. 6 shows a small area 501 (501-1 to 501-3) set at fixed coordinates among the imaged images 401-1 to 401-3 shown in FIG. 4, and shows a graph 502 in which the color information R, G, and B acquired in the small area is measured in the plurality of frames. The small area 501 may be a single pixel or an area configured of a plurality of pixels. In addition, a plurality of images may be set in the imaged image. In the graph 502, an imaging time is represented as a horizontal axis, and signal values of the color information of each of the R, G, and B are represented as a vertical direction.

In a case in which the imaged image is imaged by the imager that is the rolling shutter method, as shown in FIG. 4, the band-shaped color moves in the vertical direction by the imaging time, and the color information changes periodically in the small area 501. On the other hand, in a case in which the imager 104 is not the rolling shutter method but a global shutter method in which exposure is simultaneously performed by all imaging elements, the deviation of the color in the plane of the imaged image as shown in FIG. 4 does not occur, and only projected color of the time division projector of a moment of imaging is imaged. Therefore, since all in-planes of the imaged image are the same color, accurate color information is not able to be obtained by the in-plane integration method in which the color information is integrated in the area. Thus, in the present embodiment, it is possible to acquire the color of the screen 200 that is an imaged target without receiving the influence of the deviation of the color caused by the display period of the color time division projector, by detecting the time division period of the color of the projected image for the plurality of frames and integrating (time integrating) the small area (one pixel or the plurality of pixels) of the same coordinates in the imaged image.

Figure 7:
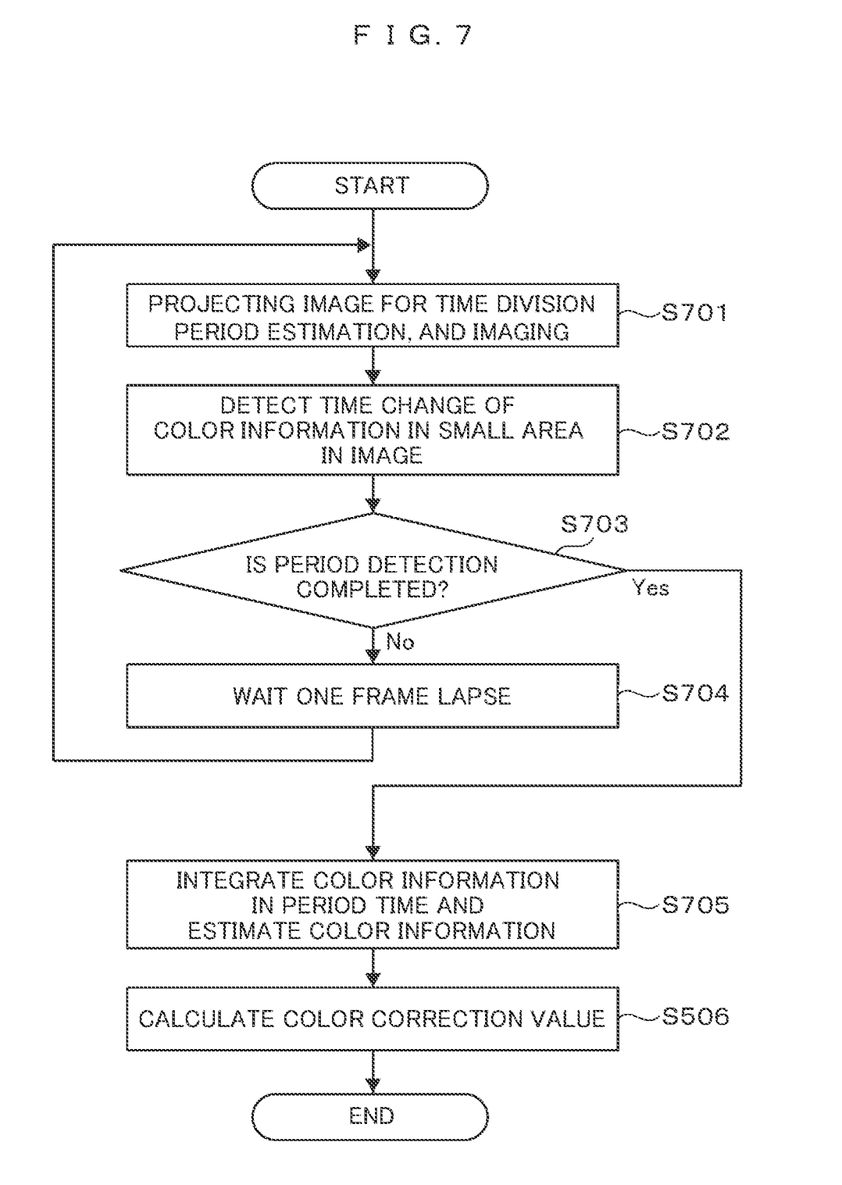
FIG. 7 is a flowchart in which the color correction of the projected video is performed in Embodiment 2.

FIG. 7 shows a flowchart in which the color of the projected video is corrected by extracting the color information with high accuracy from the projected video imaged in the projector that displays the color in the time division in the present embodiment.

In FIG. 7, first, in S701, similarly to S501 of FIG. 5, the image for acquiring and estimating the color information is projected from the video projector 108, and the imager 104 images it.

In S702, the time division period in the plurality of frames is detected by the image analyzer 105 for a prescribed small area in the imaged image imaged in S701. Since the small area of the imaged image changes as the graph 502 of the color information R, G, and B shown in FIG. 6, the time division period is detected from a time change of the color information. At this time, in order to detect the period with high accuracy, for example, the imaged image may be HSV-converted and analyzed for the change in the H component.

In S703, similarly to S503 of FIG. 5, it is determined whether the detection of the time division period in S702 is normally completed, and in a case in which the detection of the time division period in S702 is not normally completed, one frame is waited in S704 and the process is repeated from S702.

In S705, the Rref of the screen 200 and the illumination light Eenv are estimated by integrating the color information of one period of the time division, by using the imaged image acquired in S701 to S704 and the detected time division period.

Thereafter, similarly to S506 of FIG. 5, the color correction amount by the color corrector 102 is calculated on the basis of the surface reflectance Rref of the screen 200 and the illumination light Eenv estimated by S705 in S506.

As described above, when carrying out the color correction according to the projection conditions in the color time division projector, even in a case in which the imager is the global shutter method and the color separation is viewed when the projected video is imaged, it is possible to detect and correct the color information with high accuracy.

Embodiment 3

In the present embodiment, an example in which it is possible to select the in-plane integration method of Embodiment 1 and the time integration method of Embodiment 2 as the color information detection method will be described.

Figure 8:
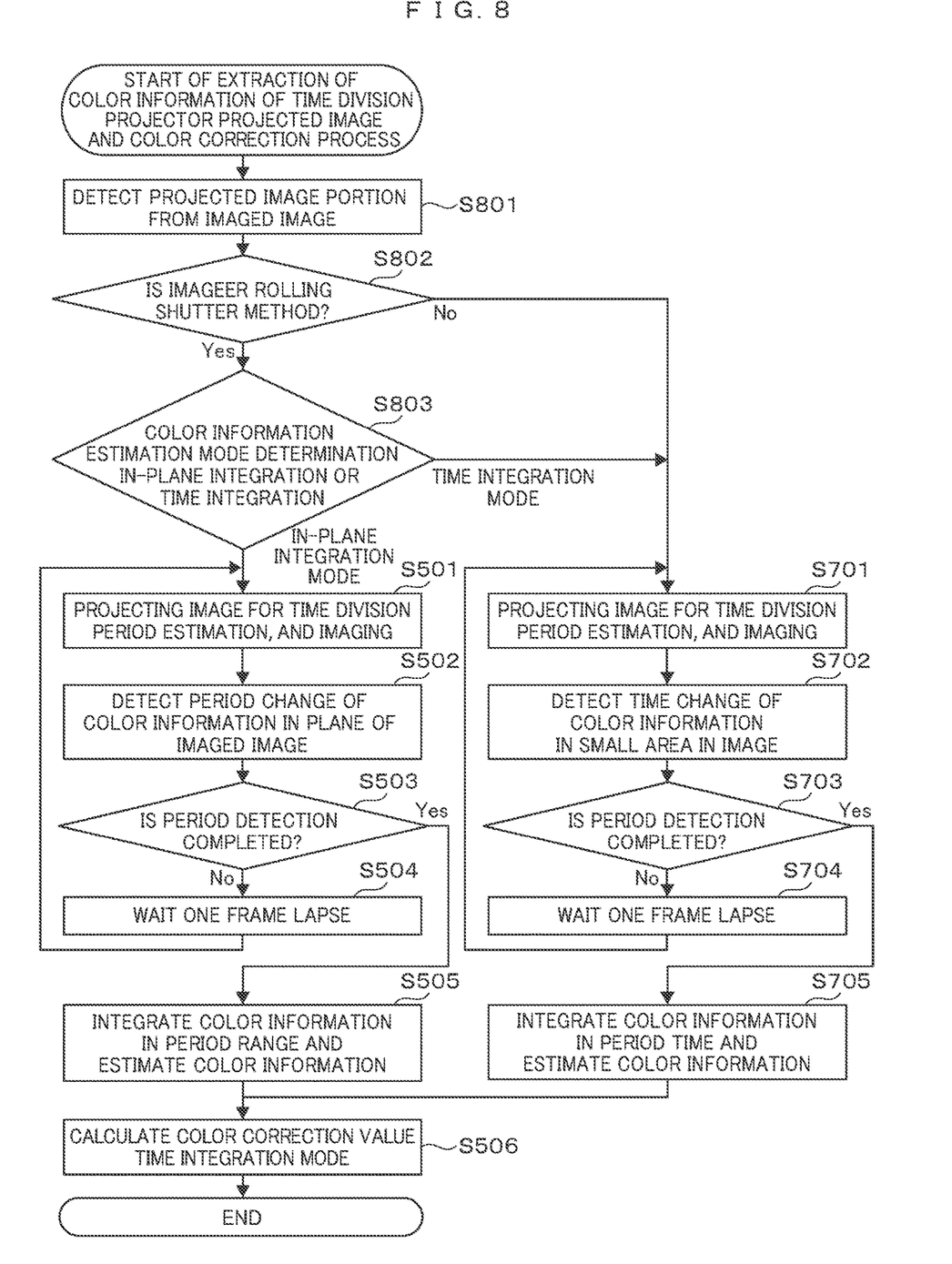
FIG. 8 is a flowchart in which the color correction of the projected video is performed in Embodiment 3.

FIG. 8 shows a flowchart in which the color of the projected video is corrected by extracting the color information with high accuracy from the projected video imaged in the projector that displays the color in the time division in the present embodiment.

In FIG. 8, first, in a case in which the present process is started, the screen 200 is imaged by the imager 104, and the projected video 201 in the imaged image is detected by the image analyzer 105 (S801). As the detection method, each of a state in which the video is not projected from the video projector and a state in which an appropriate video is projected from the video projector is imaged, and a difference between these imaged images is calculated to detect a projected video portion. However, the method of detecting the projected video portion is not limited thereto, and for example, when the light source 300 emits light including infrared light and the imager 104 has sensitivity to the infrared light, infrared component may be detected from the imaged image, and the projected video portion may be detected by displaying a pattern of which a shape is known in a part or the whole of the video projected from the video projector and detecting the pattern in the imaged image. Alternatively, a graphic user interface (GUI) or an operation panel for a manual operation may be added to the projection-type video display apparatus 100, and the projected video portion in the imaged image may be selected by a designation of a user to be a detection result.

In S802, it is determined whether the imager 104 is the rolling shutter method. As the determination method, setting may be manually performed by the user, or, for example, a flicker of a fluorescent lamp or a moving object may be detected from the image imaged by the imager, and presence or absence of the position deviation of the image or the deviation of the color information caused by the deviation of the exposure time in the plane may be determined. In particular, this determination is necessary in a case in which the imager 104 is externally attached. In addition, in a known case, this determination is unnecessary. In a case in which the imager 104 is not the rolling shutter method, for example, the global shutter method, as described above, the band-shaped color is not viewed in the imaged image as illustrated in FIG. 4, an image is obtained in which the color separated by the color wheel 301 is able to be viewed on the entire screen. At this time, the color information for one period of the time division period is not able to be integrated in the plane of the imaged image, and it is necessary to time-integrate and estimate the color information for the plurality of frame images.

In S803, as the method of estimating the color information, the user selects an in-plane integration mode in which the color information is integrated and estimated in the plane of the imaged image or a time integration mode in which the color information is integrated and estimated for the plurality of frame images.

Subsequently, in the case of the in-plane integration mode, as described in FIG. 5 of Embodiment 1, S501 to S505 are carried out to estimate the color information. In addition, in the case of the time integration mode, as described in FIG. 7 of Embodiment 2, S701 to S705 are carried out to estimate the color information. In addition, in S506, the color correction amount by the color corrector 102 is calculated on the basis of the estimated color information.

As described above, regardless of whether the imager is the rolling shutter method or the global shutter method, when carrying out the color correction according to the projection conditions in the color time division projector, even in a case in which the color separation is viewed when the projected video is imaged, it is possible to detect and correct the color information with high accuracy.

Note that, in the embodiment described above, it has been described that the color correction is uniformly performed in the plane of the projected video, but it is possible to perform the color correction for each small area or pixel in the plane according to the following method. That is, after the time integration mode is selected in S803, and the projected video is imaged by the imager 104, it is possible to calculate the color correction values for each small area or pixel by acquiring the color information for the small area or the entire pixel of the projected video portion. For example, even in a case in which the video is projected using a wall having a pattern as the screen, it is possible to realize the color correction that reduces an influence of color and the pattern of the wall and improves visibility of the projected video.

In addition, it is possible to change distribution of the color separation in the imaged image and the period, by changing the deviation of the exposure time by changing, for example, an exposure setting as an imaging condition of the imager 104 with respect to the separation of the color in the imaged image caused by the deviation of the exposure time in the plane in the imager 104 and the time division period displayed by the video projector 108 as described above. As a specific example, in order to change the exposure time of the camera while maintaining a luminance of the imaged image, a gain, an aperture, or the like is adjusted. Therefore, for example, in a case in which the time division period is not able to be normally detected in S503 or S703, it is possible to change the distribution of the color separation in the imaged image and the period by adjusting the exposure setting for the purpose of improving estimation accuracy of the time division period.

REFERENCE SIGNS LIST

100 Projection-type video display apparatus
101 Image input unit
102 Color corrector
103 Imaging controller 104 Imager
105 Image analyzer
106 Time division period acquisition unit
107 Video display unit
108 Video projector
200 Screen
201 Projected video
401-1 to 401-3 Imaged image
402-1 to 402-3 Explanatory diagram
403 Area for one period of time division
501 (501-1 to 501-3) Small area
502 Graph obtained by measuring color information R, G, and B acquired in small area in a plurality of frames

The invention claimed is:

1. A projection-type video display apparatus comprising:
a video projector configured to display a plurality of color images in time division based on an input image and to project a video based on the displayed color images;
a color corrector configured to perform color correction on the input image; and
a time division period detector configured to detect a time division one period or N times period of the time division one period of the projected video based on an imaged projected video obtained by an internal imaging apparatus or an external imaging apparatus connected by a wire or a wireless connection and imaging the projected video,
wherein the color corrector performs the color correction on the input image based on color information of a video corresponding to the detected time division one period or the detected N times period of the time division one period, and
wherein the internal imaging apparatus or the external imaging apparatus supports a rolling shutter method, and the time division period detector detects the time division one period or N times period of the time division one period by detecting a period in which the color information in the vertical direction is changed in one frame of the captured projected video.

2. The projection-type video display apparatus according to claim 1, further comprising:
an imaging controller configured to control an imaging condition of the imaging apparatus so that a video corresponding to the time division one period in the projected video is included in the one frame of the imaged projected video.

3. The projection-type video display apparatus according to claim 1, wherein the time division period detector is configured to detect the time division one period or N times period of the time division one period by performing image analyzing on the imaged projected video.

4. The projection-type video display apparatus according to claim 1, wherein the color corrector estimates a surface reflectance of the screen on which the projected video is projected and a spectral characteristic of ambient light by integrating the color information of time division one period or N times period of the time division one period, calculates a color correction amount on the basis of the estimated surface reflectance of the screen and the spectral characteristic of ambient light, and performs out a color correction by using the calculated color correction amount.

5. A projection-type video display apparatus comprising:
a video projector configured to display a plurality of color images in time division based on an input image and to project a video based on the displayed color images;
a color corrector configured to perform color correction on the input image; and
a time division period detector configured to detect a time division one period or N times period of the time division one period of the projected video based on an imaged projected video obtained by an internal imaging apparatus or an external imaging apparatus connected by a wire or a wireless connection and imaging the projected video,
wherein the color corrector performs the color correction on the input image based on color information of a video corresponding to the detected time division one period or the detected N times period of the time division one period, and
wherein the internal imaging apparatus or the external imaging apparatus supports global shutter method, and the time division period detector detects the time division one period or N times period of the time division one period by detecting a change in the color information of a predetermined region including a same coordinates between a plurality of frames of the imaged projected video.

6. A projection-type video display apparatus comprising:
a video projector configured to display a plurality of color images in time division based on an input image and to project a video based on the displayed color images;
a color corrector configured to perform color correction on the input image; and
a time division period detector configured to detect a time division one period or N times period of the time division one period of the projected video based on an imaged projected video obtained by an internal imaging apparatus or an external imaging apparatus connected by a wire or a wireless connection and imaging the projected video,
wherein the color corrector performs the color correction on the input image based on color information of a video corresponding to the detected time division one period or the detected N times period of the time division one period,
wherein the time division period detector has a first mode corresponding to a rolling shutter method and a second mode corresponding to a global shutter method,
wherein in the first mode, the time division period detector detects the time division one period or N times period of the time division one period by detecting a period in which the color information in the vertical direction is changed in one frame of the captured projected video,
wherein in the second mode, the time division period detector detects the time division one period or N times period of the time division one period by detecting a change in the color information of a predetermined region including a same coordinates between a plurality of frames of the imaged projected video, and
wherein either the first mode or the second mode is selected by an user of the projection-type video display apparatus.

7. The projection-type video display apparatus according to claim 5, further comprising:
an imaging controller configured to control an imaging condition of the imaging apparatus so that a video corresponding to the time division one period in the projected video is included in the one frame of the imaged projected video.

8. The projection-type video display apparatus according to claim 5, wherein the time division period detector is configured to detect the time division one period or N times period of the time division one period by performing image analyzing on the imaged projected video.

9. The projection-type video display apparatus according to claim 5, wherein the color corrector estimates a surface reflectance of the screen on which the projected video is projected and a spectral characteristic of ambient light by integrating the color information of time division one period or N times period of the time division one period, calculates a color correction amount on the basis of the estimated surface reflectance of the screen and the spectral characteristic of ambient light, and performs a color correction by using the calculated color correction amount.

10. The projection-type video display apparatus according to claim 6, further comprising:

an imaging controller configured to control an imaging condition of the imaging apparatus so that a video corresponding to the time division one period in the projected video is included in the one frame of the imaged projected video.

11. The projection-type video display apparatus according to claim 6, wherein the time division period detector is configured to detect the time division one period or N times period of the time division one period by image analyzing on the imaged projected video.

12. The projection-type video display apparatus according to claim 6, wherein the color corrector estimates a surface reflectance of the screen on which the projected video is projected and a spectral characteristic of ambient light by integrating the color information of time division one period or N times period of the time division one period, calculates a color correction amount on the basis of the estimated surface reflectance of the screen and the spectral characteristic of ambient light, and performs out a color correction by using the calculated color correction amount.

* * * * *